(12) United States Patent
Rubio et al.

(10) Patent No.: US 9,893,960 B2
(45) Date of Patent: Feb. 13, 2018

(54) DEVICE HUB SYSTEM WITH RESOURCE ACCESS MECHANISM AND METHOD OF OPERATION THEREOF

(71) Applicant: S-PRINTING SOLUTION CO., LTD., Suwon-si, Gyeonggi-Do (KR)

(72) Inventors: Ramon Rubio, Rossmoor, CA (US); Joseph Yang, Cypress, CA (US); Wei-jhy Chern, Irvine, CA (US)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 49 days.

(21) Appl. No.: 14/823,911

(22) Filed: Aug. 11, 2015

(65) Prior Publication Data

US 2016/0050340 A1 Feb. 18, 2016

Related U.S. Application Data

(60) Provisional application No. 62/036,528, filed on Aug. 12, 2014.

(51) Int. Cl.
*G06F 7/04* (2006.01)
*H04L 12/24* (2006.01)
*H04N 1/00* (2006.01)
*H04N 1/44* (2006.01)

(52) U.S. Cl.
CPC ........ *H04L 41/5054* (2013.01); *H04L 41/046* (2013.01); *H04L 41/0896* (2013.01); *H04L 41/5025* (2013.01); *H04N 1/00408* (2013.01); *H04N 1/4413* (2013.01); *H04N 1/4426* (2013.01); *H04N 1/4433* (2013.01); *H04N 2201/0094* (2013.01)

(58) Field of Classification Search
CPC ............... H04L 41/0896; H04L 41/046; H04L 41/5025
USPC .......................................................... 726/27
See application file for complete search history.

(56) References Cited

U.S. PATENT DOCUMENTS

| | | | |
|---|---|---|---|
| 7,865,959 B1 * | 1/2011 | Lewis ................. | G06F 21/6218 726/17 |
| 9,019,535 B1 * | 4/2015 | Hansen ................. | G06F 3/1203 358/1.13 |
| 9,377,979 B1 * | 6/2016 | Hansen ................. | G06F 3/1203 |
| 2003/0067621 A1 * | 4/2003 | Tanaka ................... | G06K 15/00 358/1.13 |
| 2008/0060061 A1 * | 3/2008 | Deshpande ......... | H04L 63/0823 726/5 |
| 2011/0238855 A1 * | 9/2011 | Korsunsky ............. | G06F 21/55 709/231 |

(Continued)

OTHER PUBLICATIONS

BYOD: Bring Your Own Device/ http://www.vs.inf.ethz.ch/publ/papers/rohs-byod-2004.pdf 2004.

*Primary Examiner* — Teshome Hailu
(74) *Attorney, Agent, or Firm* — Staas & Halsey LLP

(57) ABSTRACT

A device hub system includes: a control unit configured to: generate a workroom for providing access to a workroom accessible resource, including an enterprise multifunctional printer, protected by a network firewall; provide authentication for a participant device to access the workroom; receive a workroom request through the workroom; generate a workroom sharable information from the workroom request; and a communication unit, coupled to the control unit, configured to distribute the workroom sharable information within the workroom.

15 Claims, 7 Drawing Sheets

(56) References Cited

U.S. PATENT DOCUMENTS

| | | | |
|---|---|---|---|
| 2012/0017262 A1* | 1/2012 | Kapoor | G06F 9/505 726/1 |
| 2013/0254837 A1 | 9/2013 | Brannon et al. | |
| 2014/0007183 A1 | 1/2014 | Qureshi et al. | |
| 2014/0049797 A1* | 2/2014 | Huster | G06F 3/1212 358/1.15 |
| 2014/0173692 A1 | 6/2014 | Srinivasan et al. | |
| 2015/0007273 A1* | 1/2015 | Lin | H04L 47/10 726/4 |

* cited by examiner

DEVICE HUB SYSTEM WITH RESOURCE ACCESS MECHANISM AND METHOD OF OPERATION THEREOF

CROSS-REFERENCE TO RELATED APPLICATION(S)

This application claims the benefit of U.S. Provisional Patent Application Ser. No. 62/036,538 filed Aug. 12, 2014, and the subject matter thereof is incorporated herein by reference thereto.

TECHNICAL FIELD

An embodiment of the present invention relates generally to a device hub system, and more particularly to a system for resource access.

BACKGROUND

Modern consumer and industrial electronics, especially devices such as multifunctional peripheral devices, network devices, and electronic appliances are providing increasing levels of functionality to support modern life including resource sharing and solutions for these devices. Research and development in the existing technologies can take a myriad of different directions.

As more devices include advanced security features, device owners insist on using their devices to connect to organization networks and use the organization resources that may not be associated with those organizations. Furthermore, to improve productivity, these devices require additional means to exchange information with other devices and utilize protected or restricted resources on the organization networks.

Thus, a need still remains for a device hub system with resource access mechanism for managing information exchange protected network resources. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a system, including: a control unit configured to: generate a workroom for providing access to a workroom accessible resource, including an enterprise multifunctional printer, protected by a network firewall; provide authentication for a participant device to access the workroom; receive a workroom request through the workroom; generate a workroom sharable information from the workroom request; and a communication unit, coupled to the control unit, configured to distribute the workroom sharable information within the workroom.

An embodiment of the present invention provides a method including: generating a workroom for providing access to a workroom accessible resource, including an enterprise multifunctional printer, protected by a network firewall; providing authentication for a participant device to access the workroom; receiving a workroom request from the participant device through the workroom; generating with a control unit a workroom sharable information from the workroom request; and distributing the workroom sharable information within the workroom.

An embodiment of the present invention provides a non-transitory computer readable medium including: generating a workroom for providing access to a workroom accessible resource, including an enterprise multifunctional printer, protected by a network firewall; providing authentication for a participant device to access the workroom; receiving a workroom request from the participant device through the workroom; generating a workroom sharable information from the workroom request; and distributing the workroom sharable information within the workroom.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
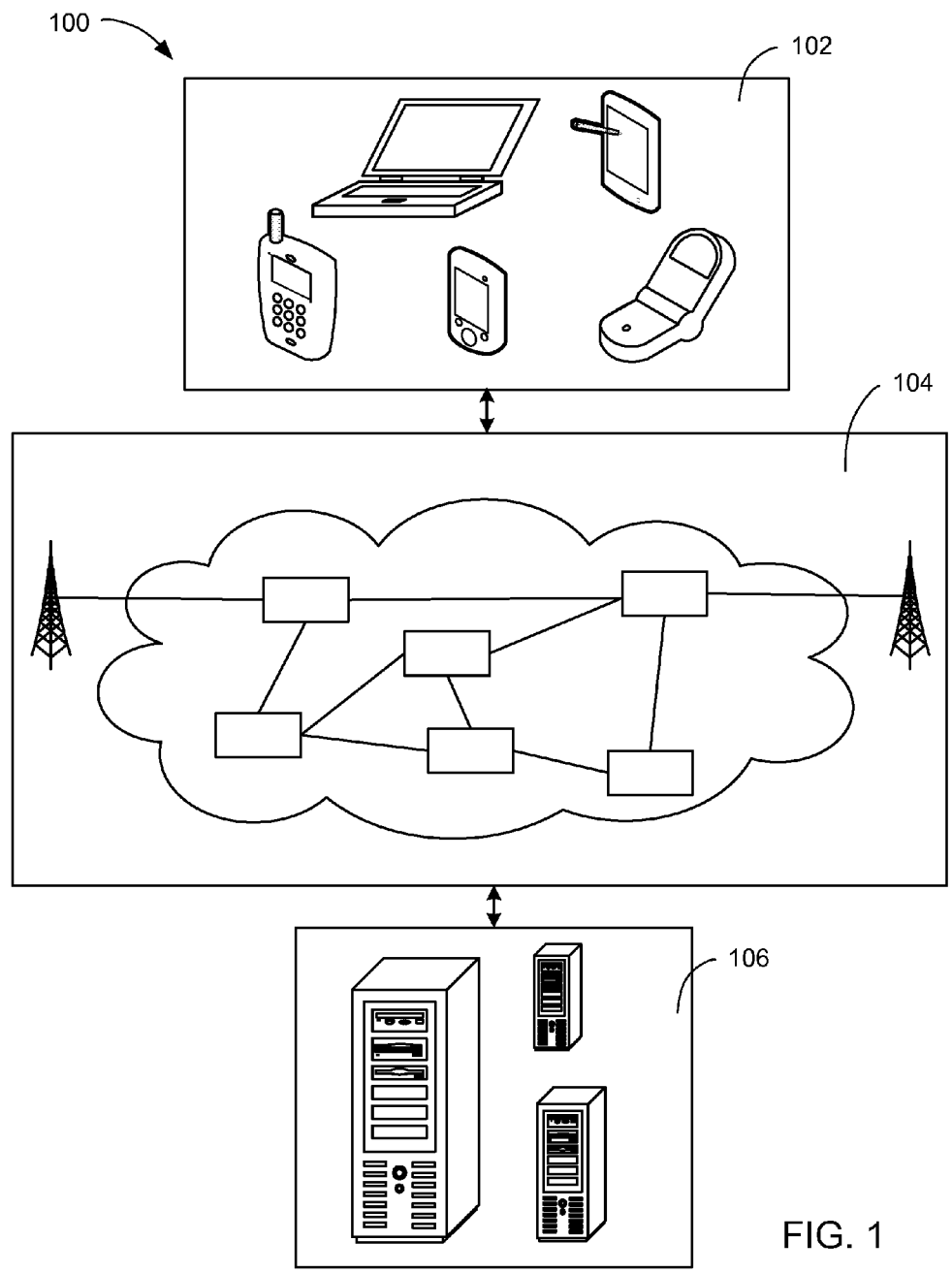
FIG. 1 is a multifunctional platform system with device management mechanism in an embodiment of the present invention.

Installing the print drivers for the restricted enterprise resources on the work hub enables the work hub to process or configure documents for printing on the restricted enterprise resources and provides the advantage of eliminating the need for installing the print drivers on the participant devices.

Generating the multi-time password reduces resource consumption of the work hub system. Multi-time password can be used to join multiple instances of the participant devices associated with one of the workroom participants to the workroom, which eliminates the need to generate and issue a different password for each of the participant devices which reduces resource consumption of the work hub system.

The workroom can improve productivity for the workroom participants. Generating the workroom that grants access to the untrusted devices allows the untrusted devices to utilize the workroom accessible resources on the closed network that would not be available for use without the workroom, which improves productivity of the workroom participants associated with the untrusted devices.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims. Also for example, hardware can be memory device or a portion therein storing or including instructions executable by circuitry, processor, computer, integrated circuit, integrated circuit cores, MEMS, passive device, or a combination thereof.

The modules in the following description of the embodiments can be coupled to one other as described or as shown. The coupling can be direct or indirect without or with, respectively, intervening items between coupled items. The coupling can be physical contact or by communication between items. For example, coupling can include communication between modules, such as function calls or jumps, through shared memory or an application programming interface.

Referring now to FIG. 1, therein is shown a device hub system 100 with resource access mechanism in an embodiment of the present invention. The device hub system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a multifunctional peripheral device, such as a multifunctional printer or copy machine, cellular phone, personal digital assistant, a notebook computer, a television, projector, a smart television having networking capabilities. The first device 102 can couple, either directly or indirectly, to the communication path 104 to communicate with the second device 106 or can be a stand-alone device.

The second device 106 can be any of a variety of centralized or decentralized computing devices. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the device hub system 100 is described with the second device 106 as a computing device, although it is understood that the second device 106 can be different types of devices. Also for illustrative purposes, the device hub system 100 is shown with the second device 106 and the first device 102 as end points of the communication path 104, although it is understood that the device hub system 100 can have a different partition between the first device 102, the second device 106, and the communication path 104. For example, the first device 102, the second device 106, or a combination thereof can also function as part of the communication path 104. As a specific example, the first device 102 can be connected to other devices through the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
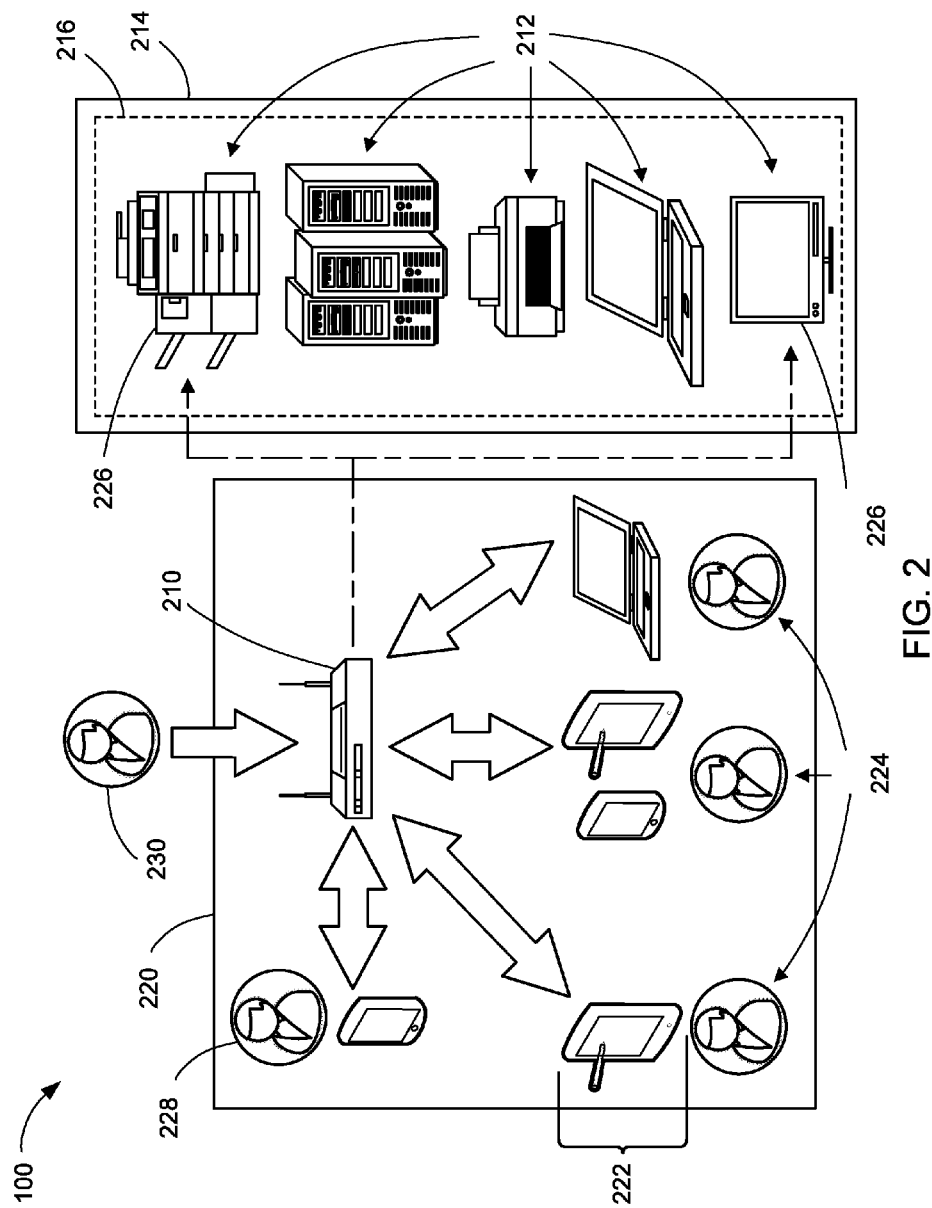
FIG. 2 is an example of the device hub system.

Referring now to FIG. 2, therein is shown an example of the device hub system 100. The device hub system 100 can include a work hub 210. The work hub 210 is a gateway for enabling and managing access to protected or secure resources and providing secure connectivity and information sharing between devices connected to the work hub 210. For example, the work hub 210 can be a physical electronic device or component that provides connectivity and information sharing between computing devices restricted enterprise resources 212 and other computing devices.

The restricted enterprise resources 212 are computing devices, peripheral devices, productivity resources, or a combination thereof on a private or protected computer network. For example, the restricted enterprise resources 212 can include network servers, multifunctional printers, computers, stand-alone printers, or display devices, such as projectors, televisions, or smart televisions. The restricted enterprise resources 212 can be on a closed network 214 to prevent unauthorized access to the restricted enterprise resources 212.

The closed network 214 is a network of computers, electronic devices, or a combination thereof that is not accessible by the public. For example, the closed network 214 can be a protected network, protected by a network firewall 216, that can include computers coupled to peripheral devices, such as multifunctional printers, copiers, fax machines, or a combination thereof.

The network firewall 216 is a computer system or computer network that is designated to block unauthorized access while permitting authorized communications. For example, the network firewall 216, which can be implemented in hardware, software, or a combination thereof, can prevent unauthorized network users, such as internet users, from accessing the closed network 214 or private devices connected to the closed network 214 such as peripheral devices productivity resources. As a specific example, messages or communications entering or leaving the closed network 214 pass through the network firewall 216 which examines each message or communication and blocks those messages that do not meet a specified security criteria.

For illustrative purposes, the work hub 210 is shown as a standalone device however, it is understood that the work hub 210 can be a component that is integrated with another device. For example, the work hub 210 can be an electronic hardware component that is integrated with a peripheral device, such as a multifunctional printer, or a display device, such as a smart TV.

FIG. 2 depicts a number of computing devices connected to the work hub 210. The work hub 210 can enable the computing devices to interface with one another and the restricted enterprise resources 212 through a workroom 220. The workroom 220 is a secure virtual space that provides an interface for communication and information exchange between the computing devices and access to protected productivity resources.

The computing devices that are authorized to join the workroom 220 through the work hub 210 are participant devices 222. For example, the participant devices 222 can be the computing devices that have been registered with the work hub 210 to access a particular or specified instance of the workroom 220. The participant devices 222 can be the first device 102 of FIG. 1 and can include a variety of computing devices, such as tablet computers, laptop computers, smart phones, desktop computers.

The participant devices 222 can join the workroom 220 through the work hub 210 by physical wired or wireless connection. For example, wireless connection to the work hub 210 can be achieved through various protocols, such as wireless application protocol (WAP), wireless display (WiDi) technology, Bluetooth (BLE), wireless local area network (WLAN), near field communication (NFC), or wireless gigabit alliance (WiGIG). The work hub 210 can support other means of connection, such as secure hypertext transfer protocol (HTTPS), extensible messaging and presence protocol (XMPP), or websocket protocols. The work hub 210 can also support a remote bridge for remote access to the work hub 210.

The participant devices 222 can be associated with workroom participants 224. The workroom participants are users of the participant devices 222 that have been granted access to the workroom 220. For example, the workroom participants 224 can be the owner of one or more of the participant devices 222 or an individual that is authorized to use one or more of the participant devices 222.

The workroom 220 can enable the participant devices 222 to interface and exchange information with one another through the workroom 220. For example, the workroom 220 can enable one of the participant devices 222 to share or distribute documents through the workroom 220 to the other instances of the participant devices 222.

The workroom 220 can enable access to instances of the restricted enterprise resources 212. The restricted enterprise resources 212 that have been exposed or assigned to the workroom 220 can be designated as workroom accessible resources 226. The workroom accessible resources 226 are instances of the restricted enterprise resources 212 that are exposed to the workroom 220 and governed by specified policies, which will be discussed in detail below. The connection between the work hub 210 and the workroom accessible resources 226 is depicted by the dotted lines.

The workroom 220 can enable the participant devices 222 to utilize features and functions of the workroom accessible resources 226. For example, the participant devices 222 can implement the printing function of the workroom accessible resources 226, which in this example can be a printer or multifunctional printer, by sending documents to the work hub 210 through the workroom 220. In another example, the participant devices 222 can use scan function of the workroom accessible resources 226, which in this example can be a document scanner or multifunctional printer with scanning capability, to scan a physical document, which can be sent to and distributed to the participant devices 222. In a further example, the participant devices 222 can use the display feature on the workroom accessible resources 226, which in this case can be a smart TV or projector, to display media files by sending the media files to the work hub 210 through the workroom 220.

The workroom 220 can be a time boxed entity with restrictions on duration, after which the workroom 220 will be closed and no longer accessible. For example, the workroom 220 can be set to expire after a predetermined period of time, which can be set by the hub administrator 230 or the workroom owner 228. In another example, the workroom 220 can be set to expire based on an event trigger, such as when the workroom owner 228 disconnects from the workroom 220 or when all the workroom participants 224 disconnect their associated participant devices 222 from the workroom 220.

The operation and access to the workroom 220 can be managed by a workroom owner 228. The workroom owner 228 is a user of the work hub 210 with authority to manage one or more instances of the workroom 220. For example, the workroom owner 228 can provide authorization for the workroom participants 224 and associated participant devices 222 to access the workroom 220; monitor the activity of the participant devices 222; set limitations on access to the workroom accessible resources 226; or a combination thereof. The management functions associated with the workroom owner 228 will be discussed in detail below.

The work hub 210 can be management by a hub administrator 230. The hub administrator 230 is an administrator having the authority to grant or restrict access to resources on the protected network. The hub administrator 230 can manage the operation and functionality of the work hub 210. For example, the hub administrator 230 can have the authority to generate the workroom 220; appoint the workroom owner 228; designate the restricted enterprise resources 212 as the workroom accessible resources 226; set the duration of the workroom 220; determine security settings and other restrictions for the participant devices 222; or a combination thereof. The management capability of the hub administrator 230 ad associated functions will be discussed in detail below.

Figure 3A:
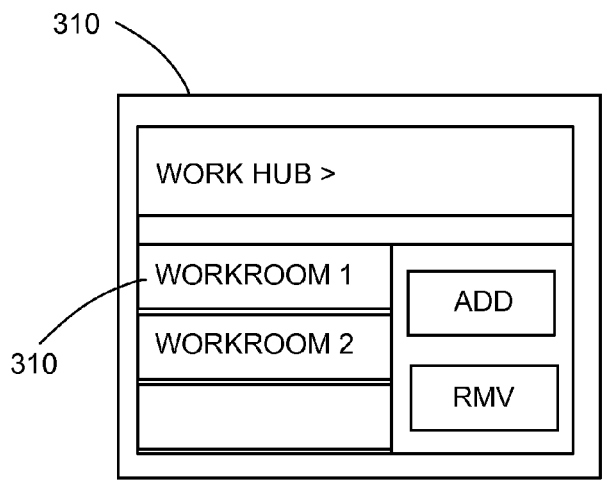
FIGS. 3A-3C are examples of a work hub interface for the work hub of FIG. 2.
Figure 3B:
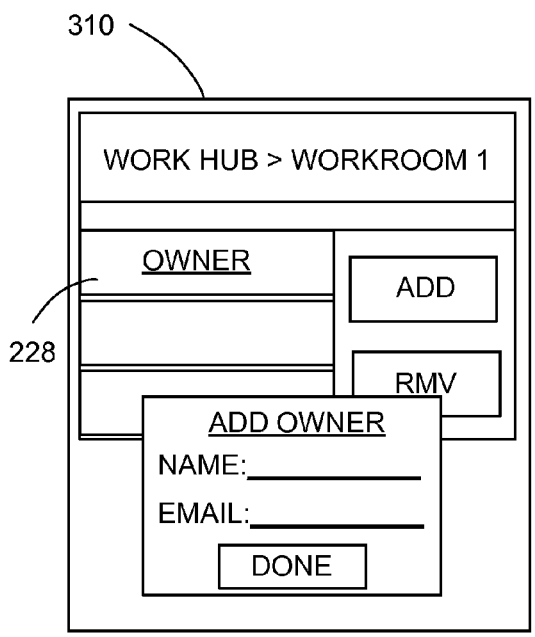
Figure 3C:
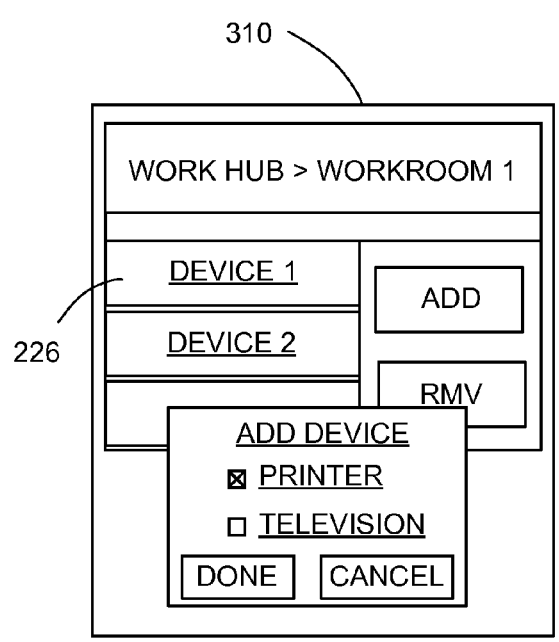

Referring now to FIGS. 3A-3C, therein are shown examples of a work hub interface 310 for the work hub 210 of FIG. 2. The work hub interface 310 is a user interface that enables the hub administrator 230 of FIG. 2 or workroom owner 228 of FIG. 2 to manage the work hub 210. For example, the work hub interface 310 can present or display options that enable the hub administrator 230 to generate the workroom 220 as depicted in FIG. 3A; appoint the workroom owner 228 as depicted in FIG. 3B; designate the restricted enterprise resources 212 as the workroom accessible resources 226 as depicted in FIG. 3C; set the duration of the workroom 220; determine security settings and other restrictions for the participant devices 222 of FIG. 1; or a combination thereof. Similarly, the work hub interface 310 can enable the workroom owner 228 to authorize the workroom participants 224 of FIG. 2 and associated instances of the participant devices 222 to access the workroom 220 and set further limitations and restrictions for the workroom 220.

FIGS. 3A-3C are only example representations of the work hub interface 310. It is understood that the work hub interface 310 can be depicted differently. For example, the work hub interface 310 can have a different layout having additional options.

Figure 4:
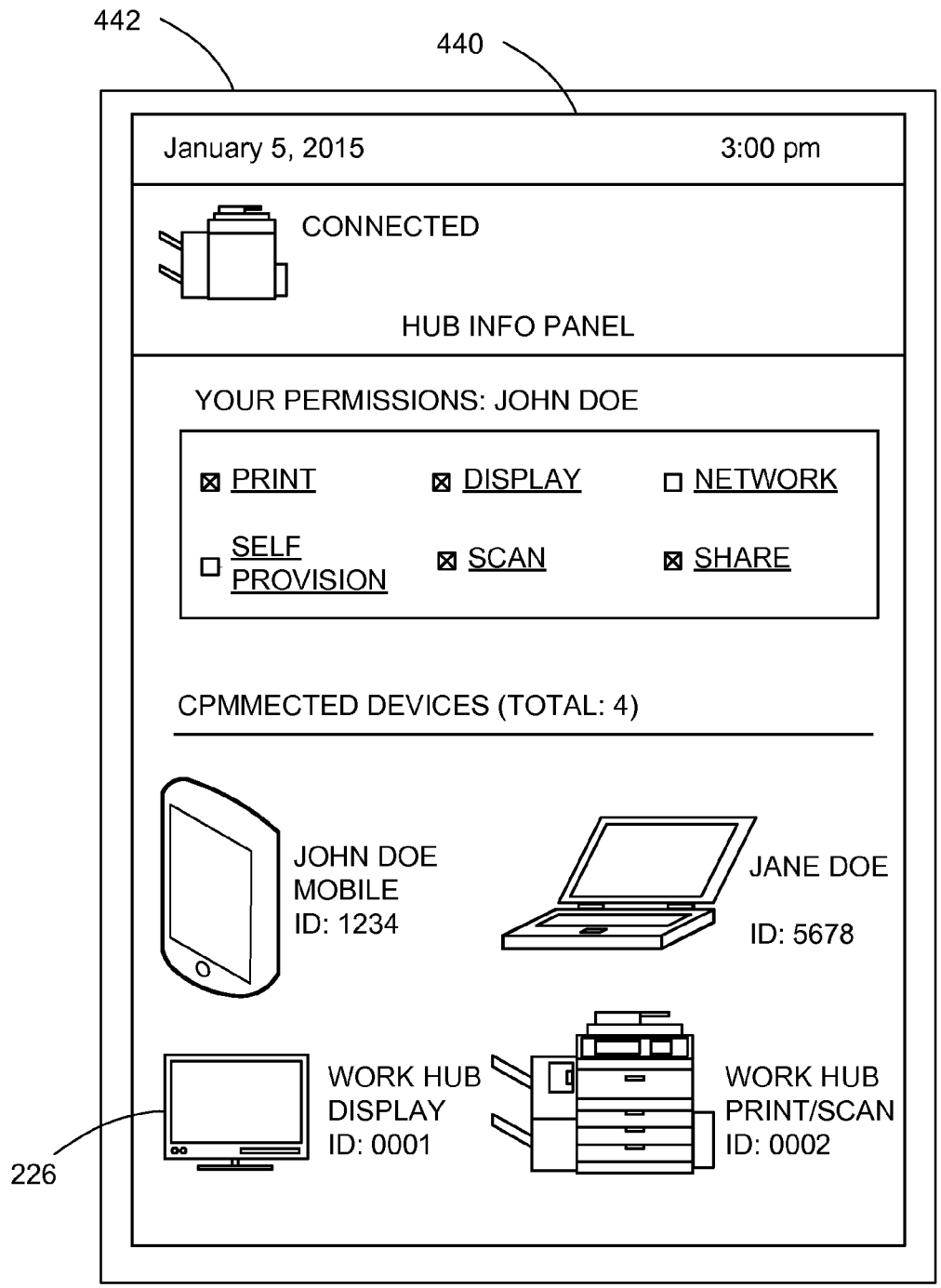
FIG. 4 is a display interface for one of the participant devices of FIG. 2.

Referring now to FIG. 4, therein is shown a display interface 440 for one of the participant devices 222 of FIG. 2. The display interface 440 can display the user interface for a participant device application 442. The participant device application 442 is an application on the participant devices 222 for interfacing with the work hub 210 of FIG. 2 and workroom 220 of FIG. 2. For example, the participant device application 442 can enable the participant devices 222 to join the workroom 220; utilize the workroom accessible resources 226 associated with the workroom 220 of FIG. 2, share with and receive information from other instances of the participant devices 222 connect to the workroom 220. Each of these functions can be implemented through the user interface of the participant device application 442 and present information about the workroom 220.

For illustrative purposes, the user interface of the participant device application 442 is depicted as displaying various information related to the workroom 220, such as connection status of the participant devices 222, the permissions available to the workroom participants 224, and the other devices connected to the workroom 220, such as other instances of the participant devices 222 and the workroom accessible resources 226, however, it is understood that the user interface of the participant device application 442 can be presented differently. For example, the user interface of the participant device application 442 can display an interface to log into the workroom 220, an interface to share files and documents with other instances of the participant devices 222, or an interface to utilize the workroom accessible resources 226.

Figure 5:
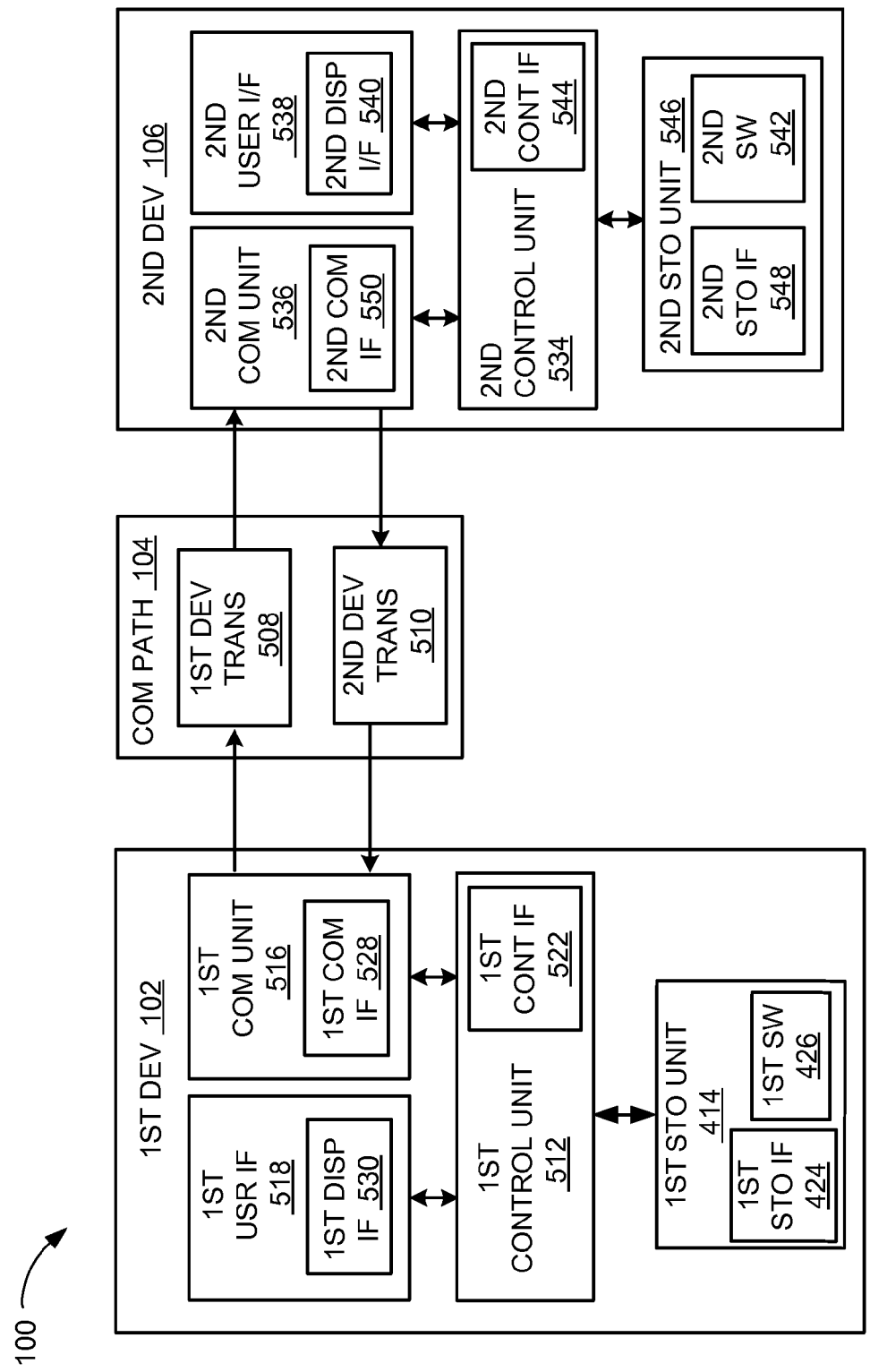
FIG. 5 is an exemplary block diagram of the device hub system.

Referring now to FIG. 5, therein is shown an exemplary block diagram of the device hub system 100. The device hub system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the device hub system 100 is shown with the first device 102 as a client device, although it is understood that the device hub system 100 can have the first device 102 as a different type of device. For example, the first device 102 can be a server having a display interface.

Also for illustrative purposes, the device hub system 100 is shown with the second device 106 as a server, although it is understood that the device hub system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 512, a first storage unit 514, a first communication unit 516, and a first user interface 518. The first control unit 512 can include a first control interface 522. The first control unit 512 can execute a first software 526 to provide the intelligence of the device hub system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof configured to execute or implement any software or instruction. Also as a more specific example, the first control unit 312 can include circuitry, such as a hardware FSM, a DSP, FPGA, digital logic, or a combination thereof configured specifically in hardware to execute or implement a function. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage unit 514 can store the first software 526. The first storage unit 514 can also store the relevant information such specifications and details for hardware and software of the first device 102.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the device hub system 100. The first control unit 512 can also execute the first software 526 for the other functions of the device hub system 100. The first control unit 512 can further execute the first software 526 for interaction with the communication path 104 via the first communication unit 516.

The second device 106 can be optimized for implementing an embodiment of the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the device hub system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the device hub system 100, including operating the second communication unit 536 to communicate with the first device 102 over the communication path 104.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof. As a more specific example, the second control unit 334 can include a processor, an embedded processor, a microprocessor, a hardware control logic, a hardware FSM, a DSP, or a combination thereof configured to execute or implement any software or instruction. Also as a more specific example, the second control unit 334 can include circuitry, such as a hardware FSM, a DSP, FPGA, digital logic, or a combination thereof configured specifically in hardware to execute or implement a function.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store relevant information such as specifications and details for hardware and software of the first device 102, the second device 106, or a combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the device hub system 100 is shown with the second storage unit 546 as a single hierarchy storage system, although it is understood that the device hub system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The device hub system 100 can be executed by the first control unit 512, the second control unit 534, or a combination thereof. For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the device hub system 100 is described by operation of the first device 102 and the second device 106. It is understood that the first device 102 and the second device 106 can operate any of the modules and functions of the device hub system 100.

Figure 6:
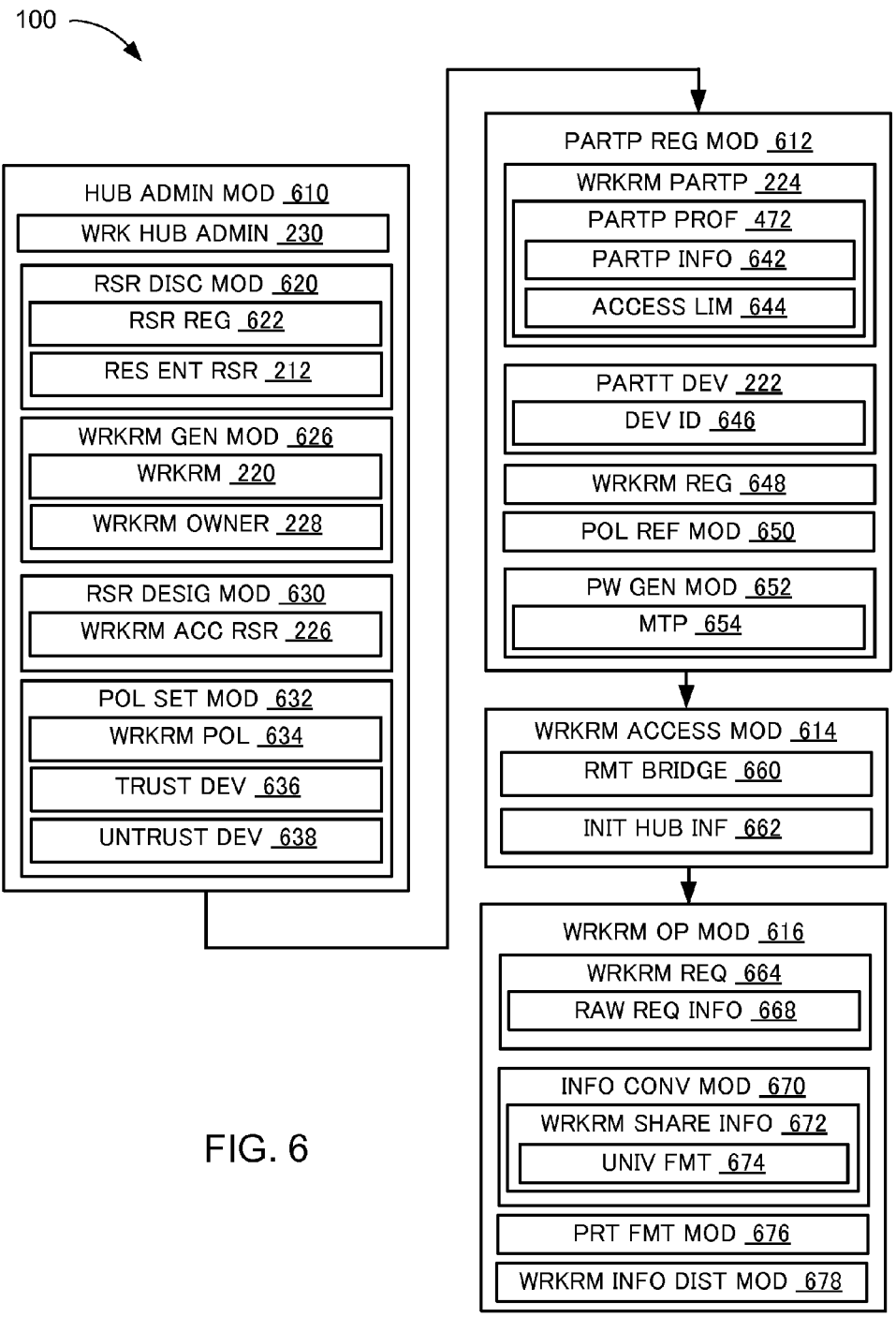
FIG. 6 is a control flow of the device hub system.

Referring now to FIG. 6, therein is shown a control flow of the device hub system 100. The device hub system 100 can include a hub administration module 610, a participant registration module, a workroom access module 614, and a workroom operation module 616. As an example, the hub administration module 610 can be coupled to the participant registration module 612. In another example, the participant registration module 612 can be coupled to the workroom access module 614. In another example, the workroom access module can be coupled to the workroom operation module 616.

The hub administration module 610 is configured to enable management of the work hub 210. For example, the hub administration module can enable the hub administrator 230 to manage features and operation of the work hub 210. Management of features and operations of the work hub 210 can include discovery and registration of the restricted enterprise resources 212; generating of the workroom 220; appointing the workroom owner 228; designating the restricted enterprise resources 212 as the workroom accessible resources 226; setting the duration of the workroom 220; determine security settings and other restrictions for the participant devices 222; or a combination thereof.

The hub administration module 610 can include a resource discovery module 620 configured to identify instances of the restricted enterprise resources 212 that are available for potential designation to the workroom 220 as the workroom accessible resources 226. For example, the resource discovery module 620 can enable the hub administrator 230 to manually add or remove the restricted enterprise resources 212 to a resource registry 622 of the work hub 210, which is a list or registry of the restricted enterprise resources 212 on the closed network 214 of FIG. 2 that are available to the work hub 210. The resource discovery module 620 can enable the hub administrator 230 to add or remove the restricted enterprise resources 212 to the resource registry 622 through the work hub interface 310.

In another example, the resource discovery module 620 can implement an automatic resource discovery protocol to identify the restricted enterprise resources 212 on the closed network 214 with or without initiation or involvement by the hub administrator 230. In an example implementation of the automatic resource discovery protocol, upon initial connection of the work hub 210 to the closed network 214, the resource discovery module 620 can poll the closed network 214 to identify the available instances of the restricted enterprise resources 212, which can then be added to the resource registry 622. In another example implementation of the automatic resource discovery protocol, the resource discovery module 620 can periodically poll the closed network 214 to update the resource registry 622. Updating of the resource registry 622 can include addition or removal of instances of the restricted enterprise resources 212 that may have been added to or removed from the closed network 214 since the previous automatic resource discovery protocol was implemented.

The discovery and registration of the restricted enterprise resources 212 can include retrieving, storing, installing, or a combination thereof of the support drivers associated with each of the restricted enterprise resources 212. For example, the resource discovery module 620 can retrieve print drivers corresponding to the restricted enterprise resources 212 that are printers or multifunctional printers from a repository on the closed network 214 or from an online source, such as the manufacture's website or an online storage medium. As a further example, the resource discovery module 620 can store, install, or a combination thereof the print drivers on the work hub 210.

It has been discovered that installing the print drivers for the restricted enterprise resources 212 on the work hub 210 enables the work hub 210 to process or configure documents for printing on the restricted enterprise resources 212 and provides the advantage of eliminating the need for installing the print drivers on the participant devices 222.

The hub administration module 610 can include a workroom generation module 626, which can be coupled to the resource discovery module 620. The workroom generation module 626 is configured to generate an instance of the workroom 220. For example, the workroom generation module 626 can be configured to enable the hub administrator 230 generate the workroom 220 by designating the workroom owner 228 for the workroom 220; designate one or more instances of the restricted enterprise resources 212 to the workroom 220 as the workroom accessible resources 226; setting the capacity of the workroom participant devices 222 for the workroom 220; setting workroom policies 634 for the workroom 220; or a combination thereof, each of which can be accomplished through the work hub interface 310.

The workroom policies 634 are rules and limitations for the workroom 220. For example, the workroom policies 634 can include restrictions or limitations on access to features on the workroom accessible resources 226. For example, for one of the workroom accessible resources 226 that includes color printing capabilities, such as a printer or multifunctional printer, the workroom policies 634 can include a restriction on color print requests and can be limited to black and white print requests. To continue the example, the workroom policies 634 can include limitations on the number of pages that can be printer for each of the workroom participants 224.

The work hub interface 310 can include interface options for the hub administrator 230 to add a new instance of the workroom 220. The hub administrator 230 can then designate the workroom owner 228 by entering identification information, such as the name or an email address specific to the workroom owner 228 or other forms of identification, including an open standard and decentralized protocol ID, such as an OpenID. The hub administration module 610 can generate an owner access code or password for the workroom owner 228 and deliver the owner access code to the workroom owner 228, which the workroom owner 228 can use to access and manage the workroom 220.

The hub administration module 610 can include a resource designation module 630, coupled to the workroom generation module 626. The resource designation module 630 is configured to enable designation of the workroom accessible resources 226. For example, the resource designation module 630 access the resource registry 622 and populate the work hub interface 310 with the available instances of the restricted enterprise resources 212. The hub administrator 230 can designate the restricted enterprise resources 212 as the workroom accessible resources 226 for a particular instance of the workroom 220 by selection through the work hub interface 310, which can be stored on the work hub 210, such as on the second storage unit 534 of FIG. 5.

The hub administration module 610 can include a policy setting module 632, coupled to the resource designation module 630. The policy setting module 632 is configured to enable setting of the workroom policies 634. For example, the policy setting module 632 can present a number of predefined or predetermined options for the workroom policies 634 associated with the workroom 220, the workroom owner 228, participant devices 222 or a combination thereof through the work hub interface 310 for selection by the hub administrator 230. In another example, the hub administrator 230 can manually enter specific conditions, rules, or limitations as the workroom policies 634 through the work hub interface 310. The workroom policies 634 that have been set by the hub administrator 230 can be received by the policy setting module 632, which can be stored on the work hub 210, such as on the second storage unit 534.

The workroom policies 634 can be set to be uniformly enforced to all of the workroom participants 224 or differently to select ones of the workroom participants 224. For example, the workroom policies 634 can be set more liberally for the workroom participants 224 associated with trusted devices 636, which can allow unrestricted use of some or all the features on the workroom accessible resources 226, while the workroom policies 634 for workroom participants 224 associated with untrusted devices 638 can be more restricted to limited use of some or all of the features of the workroom accessible resources 226 relative to the trusted devices 636.

The trusted devices 636 are instances of the participant devices 222 that are authorized to access the closed network 214. For example, the trusted devices 636 can be a device, such as a mobile phone, tablet computer, or laptop computer that has been assigned to an employee of the organization or entity associated with the closed network 214.

The untrusted devices 638 are devices that do not have authorization to access the closed network 214. For example, the untrusted devices 638 can be a device owned by a guest or visitor to the organization or entity associated with the closed network 214.

The capacity and duration of the workroom 220 can be set by the hub administrator 230 through the work hub interface 310 with the hub administration module 610. For example, the hub administrator 230 can enter the capacity as a specific number of the workroom participants 224 through the work hub interface 310. The hub administration module 610 can receive the duration and capacity settings for a particular instance of the workroom 220 from the work hub interface 310, which can be stored on the work hub 210, such as on the second storage unit 534.

The participant registration module 612 is configured to register entities or individuals with the workroom 220, register devices associated with participants with the workroom 220, and set access levels to resources associated with the workroom 220 for each of the participants, devices associated with the participants, or a combination thereof. The participant registration module 612 can enable the workroom owner 228 to register one or more entities or individuals as the workroom participants 224 with an instance of the workroom 220. For example, the workroom owner 228 can access the work hub interface 310 of the work hub 210, select an active or available instance of the work hub 210 that the workroom owner 228 has authorization over, and generate a participant profile 640 for the workroom participants 224. The participant profile 640 is an entry in a listing or registry specific to the workroom participants 224 that includes authorizations and devices associated with the workroom participants 224. The participant profile 640 can be stored on the second storage unit 534.

As an example, the workroom owner 228 can generate the participant profile 640 through the work hub interface 310 by creating a new entry in a workroom registry 648, which is a listing of entities or participants that are authorized to access the workroom 220, and entering participant information 642 for one of the workroom participants 224. The participant information 642 is an identifier unique to one of the workroom participants 224. For example, the participant information 642 can include the name or an email address specific to one of the workroom participants 224 or other forms of identification, including an open standard and decentralized protocol ID, such as an OpenID.

The participant registration module 612 can enable registration of one or more the participant devices 222 associated with one of the workroom participants 224 with the workroom 220. For example, the workroom owner 228 can select the participant profile 640 for one of the workroom participants 224 through the work hub interface 310 and enter a device identifier 646 for each of the participant devices 222 that will be authorized to access the workroom 220.

The device identifier 646 is information specific to a device that can be used to identify or distinguish the device from other devices. For example, the device identifier 646 can include unique information, such as a phone number for a mobile or smart phone, a device serial number, or media access control (MAC) address.

The participant registration module 612 can be configured to enable the workroom owner 228 to distinguish trusted devices 636 from untrusted devices 638 in the participant profile 640. For example, the device identifier 646 for the trusted devices 636 can include enterprise user account information, such as device credentials associated with the closed network 214.

The participant registration module 612 can enable the workroom owner 228 to set access limitations 644 as a part of the participant profile 640 associated with one or more of the participant devices 222. For example, the access limitations 644 can include the duration of access to the workroom 220, authorization for self-provisioning accessibility to cloud based resources, on-site or remote accessibility, or a combination thereof. The workroom owner 228 can set the access limitations 644 through the work hub interface 310, which is received by the work hub 210 and stored on the second storage unit 534 as part of the participant profile 640 associated with one of the workroom participants 224.

The participant registration module 612 can include a policy refinement module 650. The policy refinement module 650 is configured to enable the workroom owner 228 to refine the workroom policies 634 for all the workroom participants 224, a subset of the workroom participants 224, or one of the workroom participants 224. For example, the policy refinement module 650 can present the workroom owner 228 with options to further refine the workroom policies 634 by preventing certain instances of the participant devices 222 from accessing the workroom accessible resources 226 or limiting the participant devices 222 to only receiving documents and files. The refinements to the workroom policies 634 can be applied as a rule for the workroom 220 or applied to the participant profile 640 of an individual instance or subsets of the workroom participants 224, which can be received through the work hub interface 310 and stored on the work hub 210, such as on the second storage unit 534.

The participant registration module 612 can include a password generation module 652, coupled to the policy refinement module 650. The password generation module 652 is configured to generate a password that grants the participant devices 222 access the workroom 220. The password generation module 652 can generate a multi-time password 654 that can be issued to the workroom participants 224. The multi-time password 654 is a unique password or access code assigned to the workroom participants 224. The multi-time password 654 can be used by the workroom participants 224 to join the workroom 220 with one or more of the participant devices 222, including the untrusted devices 638 associated with the workroom participants 224. For example, the multi-time password 654 can enable multiple instances of the participant devices 222 associated with one of the workroom participants 224 to access the workroom.

The duration of the multi-time password 654 can be tied to the duration of the workroom 220. For example, the multi-time password 654 can remain valid to access the workroom 220. Once the workroom 220 is inactive or closed, the multi-time password 654 will no longer be valid for access to other instances of the workroom 220.

The password generation module 652 can generate the multi-time password 654 as a software token with various token algorithms. For example, the token algorithms can include a hash function or an encryption function.

Once the multi-time password 654 has been generated, the password generation module 652 can validate the multi-time password 654 and store the multi-time password 654 on the second storage unit 534. The password generation module 652 can update the security audit log of the work hub 210 to associated the multi-time password 654 with the workroom participants 224 and the participant devices 222 associated with the workroom participants 224.

The participant registration module 612 can deliver the multi-time password 654 to the workroom participants 224 in a number of different ways. For example, the participant registration module 612 can deliver the multi-time password 654 electronically by e-mail, text message, or a combination thereof, or on-site through a printout or on-site look up with the work hub interface 310.

The workroom access module 614 configured to manage access to the workroom 220. The workroom access module 614 can manage the login and authentication process for each of the participant devices 222.

For the workroom participants 224 that are within wireless connection, broadcast range, or on-site connection range with the work hub 210, the login and authentication process for the participant devices 222 associated with the workroom participants 224 can begin by detection of the work hub 210. In this case, the participant devices 222 can detect the work hub 210 in a number of different ways. For example, the participant device application 442 can auto-detect and connect to the work hub 210. In another example, the workroom participants 224 can manually connect to the work hub 210 by selecting a "connection to" option on the participant device application 442 or other device connection protocol installed on the participant devices 222.

The workroom access module 614 can enable remote connection to the work hub 210. For example, the workroom access module 614 can establish a remote bridge 660 with the participant devices 222 for the workroom participants 224 that are off-site. In this case, the workroom access module 614 can receive a request to connect to the work hub 210 from the participant devices 222 when the workroom participants 224 sign on to the remote bridge 660 through the participant device application 442.

Upon connection with the work hub 210, the workroom access module 614 can enable the participant devices 222 to join an instance of the workroom 220. For example, the participant device application 442 can display available or active instances of the workroom 220 based on initial hub information 662 received from the workroom access module 614. The initial hub information 662 is initial configuration and setup information. For example, the initial hub information 662 can include status and set-up information of the work hub 210, such as the available or active instances of the workroom 220, credentials and authorizations associated with the workroom participants 224, or a combination thereof.

The workroom participants 224 can select the workroom 220 through the participant device application 442, which can then prompt the workroom participants 224 to enter the multi-time password 654. The workroom access module 614 can receive the multi-time password 654 from the participant device application 442 and authenticate the instance of the participant devices 222. The workroom access module 614 can be configured to enable access for multiple instances of the participant device 222 associated with one of the workroom participants 224 to the workroom 220 by, for example, entering the multi-time password 654 for each of the participant devices 222.

Following authentication, the workroom access module 614 can retrieve the participant profile 640 to determine the workroom policies 634 and other settings associated with the instance of the participant devices 222. The workroom access module 614 can interface with the participant devices 222 to configure the participant device application 442 according to the workroom policies 634 and settings specific to each of the participant devices 222. Configuration of the participant device application 442 can include updating the interface of the participant device application 442 to display the other instances of the participant devices 222 connected to the workroom 220 and the workroom accessible resources 226 assigned to the workroom 220.

The workroom operation module 616 is configured to manage the functionality of the workroom 220 and process requests to use the workroom accessible resources 226. For example, the workroom operation module 616 can process a workroom request 664 generated by the workroom participants 224 and manage or allocate resources to execute the workroom request 664. The workroom request 664 is a request to the workroom 220, the work hub, or a combination thereof to utilize resources associated with the workroom 220 or share information with other devices connected to the workroom 220.

The workroom request 664 can include raw request information 668, which is the unprocessed or unformatted information on the participant devices 222 to be processed for distribution within the workroom 220. For example, the raw request information 668 can be document on one of the participant devices 222 in a format that is not compatible or capable of being processed by the workroom accessible resources 226.

The workroom operation module 616 can include an information conversion module 670. The information conversion module 670 is configured to generate workroom sharable information 672 from the raw request information 668. The workroom sharable information 672 is information that has been configured to a format that is processable or usable by the devices connected to the workroom 220. For example, the workroom sharable information 672 can be in a universal format 674, which is a document format that can be processed, usable, or viewable or without any additional modifications or formatting by the workroom accessible resources 226 or other instances of the participant devices 222. As a specific example, the universal format 674 can be files or information in a portable document format (PDF) or other format that is independent of application software, hardware, or operating system.

The information conversion module 670 can generate the workroom sharable information 672 in the universal format 674 from the raw request information 668 in a number of ways. For example, the information conversion module 670 can render the raw request information 668 to generate the workroom sharable information 672 as a portable document format. In another example, the information conversion module 670 can implement a representational state transfer (REST) application program interface (API) to rendering service to generate the workroom sharable information 672 from the raw request information 668.

The workroom operation module 616, which includes the information conversion module 670, can further include the first control unit 512 of FIG. 5, the second control unit 534 of FIG. 5, the first storage unit 514 of FIG. 5, the second storage unit 546 of FIG. 5, a portion thereof, or a combination thereof. The workroom operation module 616 can also use the first control unit 512, the second control unit 534 or a combination thereof to generate a workroom sharable information 672 from the workroom request 664. The workroom operation module 616 can further store the workroom sharable information 672 in the first storage unit 514, the second storage unit 546, or a combination thereof.

In a first use case, the workroom operation module 616 can manage the processing of the workroom request 664 to print documents using the workroom accessible resources 226. In this use case, the workroom accessible resources 226 can be a device with printing capabilities, such as a stand-alone printer or a multifunctional printer. As an example, the workroom participants 224 can generate the workroom request 664 by selecting the document for printing on the associated instance of the participant devices 222, accessing the participant device application 442, and selecting the instance of the workroom accessible resources 226 for printing.

The participant device application 442 can transmit the workroom request 664 to the work hub 210 for processing by the workroom operation module 616. For example, the workroom operation module 616 can include a print format module 676, coupled to the information conversion module 670. The print format module 676 is configured to prepare the workroom sharable information 672 or the raw request information 668 for printing on the workroom accessible resources 226. For example, the print format module 676 can utilize print drivers to prepare or convert the raw request information 668 or the workroom sharable information 672 to a format that is compatible with the workroom accessible resources 226 for printing. The print drivers associated with the workroom accessible resources 226 can be stored on the work hub 210 and utilized by the work hub 210 with the print format module 676, which eliminates the need for downloading and installing print drivers on the participant devices 222.

The workroom operation module 616 can include a workroom information distribution module 678, coupled to the information conversion module 670, configured to distribute the workroom sharable information 672 within the workroom 220. For example, in this use case, the workroom information distribution module 678 can transmit the raw request information 668 or the workroom sharable information 672 that has been converted to a format compatible with the workroom accessible resources 226 from the work hub 210 to the workroom accessible resources 226. In another example, the first communication unit 416 of FIG. 4 can be configured to distribute the workroom sharable information 672, the raw request information 668, or a combination thereof within the workroom 220.

In a second use case, workroom operation module 616 can manage the processing of the workroom request 664 to scan and share documents, display the scanned documents, or a combination thereof using the workroom accessible resources 226. In this use case, the workroom accessible resources 226 can be a device with scanning capabilities. As an example, the workroom participants 224 can utilize the workroom accessible resources 226 with scanning capabilities to scan a physical document to generate a scanned electronic document, which can be sent to the work hub 210.

To continue the example, the workroom participants 224 can generate the workroom request 664 for share the scanned electronic document with the workroom 220. In a specific example, the workroom participants 224 can select to share the scanned electronic document with all the participant devices 222 of the workroom 220 or specific instances of the participant devices 222 through the participant device application 442 or from the user interface of the workroom accessible resources 226. In another specific example, the workroom participants 224 can select, through the participant device application 442 or from the user interface of the workroom accessible resources 226, to send the scanned electronic document to another instance of the workroom accessible resources 226, such as a smart TV or projector, to display the scanned electronic document.

The workroom operation module 616 can receive and process the workroom request 664 to share the scanned electronic document. For example, the workroom operation module 616 can convert the scanned electronic document to the workroom sharable information 672 as described above if the scanned electronic document is not in a format or configuration to be the workroom sharable information 672. The scanned electronic document can be a portion of the raw request information 668, which can be included in the workroom request 664.

The workroom operation module 616 can send a notification of the scanned electronic document that has been converted to the workroom sharable information 672 to the other instances of the participant devices 222 or the workroom accessible resources 226. For example, the workroom operation module 616 can implement a web distributed authoring and versioning (WebDAV) protocol to enable retrieval or downloading of the workroom sharable information 672. In another example, the workroom operation module 616 can operate the workroom accessible resources 226 that includes display capabilities to push and display the workroom sharable information 672 on the workroom accessible resources 226.

In a third use case, the workroom operation module 616 can manage and process the workroom request 664 of distribution of the raw request information 668. For example, the workroom participants 224 can generating the workroom request 664 to share the raw request information 668 with the workroom 220. In a specific example, the workroom participants 224 can select to share the raw request information 668 with all the participant devices 222 of the workroom 220 or specific instances of the participant devices 222 through the participant device application 442. In another specific example, the workroom participants 224 can select, through the participant device application 442, to send the raw request information 668 to the workroom accessible resources 226, such as a smart TV or projector, to display the scanned electronic document.

The workroom operation module 616 can receive and process the workroom request 664 to distribute the raw request information 668. For example, the workroom operation module 616 can convert the raw request information 668 to the workroom sharable information 672 as described above.

The workroom operation module 616 can send a notification of the raw request information 668 that has been converted to the workroom sharable information 672 to the other instances of the participant devices 222 or the workroom accessible resources 226. For example, the workroom operation module 616 can implement a web distributed authoring and versioning (WebDAV) protocol to enable retrieval or downloading of the workroom sharable information 672. In another example, the workroom operation module 616 can operate the workroom accessible resources 226 that includes display capabilities to push and display the workroom sharable information 672 on the workroom accessible resources 226. For example, in this use case, the workroom information distribution module 678 can transmit the raw request information 668 or the workroom sharable information 672 that has been converted to a format compatible with the workroom accessible resources 226 from the work hub 210 to the workroom accessible resources 226.

It has been discovered that generating the multi-time password 654 reduces resource consumption of the work hub system 100. Multi-time password 654 can be used to join multiple instances of the participant devices 222 associated with one of the workroom participants 224 to the workroom 220, which eliminates the need to generate and issue a different password for each of the participant devices 222 which reduces resource consumption of the work hub system 100.

It has also been discovered that the workroom 220 can improve productivity for the workroom participants 224. Generating the workroom 220 that grants access to the untrusted devices 638 allows the untrusted devices 638 to utilize the workroom accessible resources 226 on the closed network 214 that would not be available for use without the workroom 220, which improves productivity of the workroom participants 224 associated with the untrusted devices 638.

The device hub system 100 has been described with module functions or order as an example. The device hub system 100 can partition the modules differently or order the modules differently. For example, the first software 526 of FIG. 5 of the first device 102 of FIG. 5 can include the modules for the device hub system 100. As a specific example, the first software 526 can include the hub administration module 610, the participant registration module 612, the workroom access module 614, the workroom operation module 616, and associated sub-modules included therein.

The first control unit 512 of FIG. 5 can execute the first software 526 to operate the modules. For example, the first control unit 512 can implement the hub administration module 610, which includes the resource discovery module 620, the workroom generation module 626, resource designation module 630, and the policy setting module 632, to identify the restricted enterprise resources 212, generate the workroom 220, designate the workroom accessible resources 226, and set the workroom policies 634, respectively. In another example, the first control unit 512 can implement the participant registration module 612 to register the workroom participants 224 and the associated participant devices 222.

In a further example, the first control unit 512 can implement the workroom access module 614 to provide authentication for a participant devices 222 to access the workroom 220 and enable multiple instances of the participant devices 222 associated with a workroom participants 224 with a multi-time password 654 wherein the multi-time password 654 is unique to the workroom participants 224. In yet a further example, the first control unit 512 can implement the workroom operation module 616, which includes the information conversion module 670 and the print format module 676, to generate the workroom sharable information 672 from the workroom request 664 and prepare raw request information 668 of the workroom request 664 for printing on the workroom accessible resources 226, respectively.

In another example of module partitions, the second software 542 of FIG. 5 of the second device 106 of FIG. 5 can include the modules for the device hub system 100. As a specific example, the second software 542 can include the hub administration module 610, the participant registration module 612, the workroom access module 614, the workroom operation module 616, and associated sub-modules included therein.

The second control unit 534 of FIG. 5 can execute the second software 542 or implement the device smart agent 218 to operate the modules. For example, the second control unit 534 can implement the hub administration module 610, which includes the resource discovery module 620, the workroom generation module 626, resource designation module 630, and the policy setting module 632, to identify the restricted enterprise resources 212, generate the workroom 220, designate the workroom accessible resources 226, and set the workroom policies 634, respectively.

In another example, the second control unit 534 can implement the participant registration module 612 to register the workroom participants 224 and the associated participant devices 222. In a further example, the second control unit 534 can implement the workroom access module 614 to provide authentication for a participant devices 222 to access the workroom 220 and enable multiple instances of the participant devices 222 associated with a workroom participants 224 with a multi-time password 654 wherein the multi-time password 654 is unique to the workroom participants 224. In yet a further example, the second control unit 534 can implement the workroom operation module 616, which includes the information conversion module 670 and the print format module 676, to generate the workroom sharable information 672 from the workroom request 664 and prepare raw request information 668 of the workroom request 664 for printing on the workroom accessible resources 226, respectively.

The modules of the device hub system 100 can be partitioned between the first software 526 and the second software 542. For example, the first software 526 can include the hub administration module 610. The first control unit 512 can execute the modules partitioned on the first software 526 as previously described. The second software 542 can include the participant registration module 612, the workroom access module 614, and the workroom operation module 616. The second control unit 534 can execute modules partitioned on the second software 542 as previously described.

The device hub system 100 can partition the modules differently or order the modules differently. For example, the policy setting module 632 resource designation module 630. Each of the modules can operate individually and independently of the other modules. Furthermore, data generated in one module can be used by another module without being directly coupled to each other.

The modules described in this application can be hardware implementation or hardware accelerators in the first control unit 516 of FIG. 5 or in the second control unit 538 of FIG. 5. The modules can also be hardware implementation or hardware accelerators within the first device 102 or the second device 106 but outside of the first control unit 516 or the second control unit 538, respectively, as depicted in FIG. 5. However, it is understood that the first control unit 516, the second control unit 538, or a combination thereof can collectively refer to all hardware accelerators for the modules.

The modules described in this application can be implemented as instructions stored on a non-transitory computer readable medium to be executed by a first control unit 512, the second control unit 536, or a combination thereof. The non-transitory computer medium can include the first storage unit 514 of FIG. 5, the second storage unit 546 of FIG. 5, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the device hub system 100 or installed as a removable portion of the device hub system 100.

The physical transformation from generating the scanned electronic document from the physical document on the workroom accessible resources 226 results in movement in the physical world, such as the workroom participants 224 generating the workroom request 664 to share the scanned electronic document. The movement in the physical world results in changes to the scanned electronic document, such as generation of workroom sharable information 672 from the scanned electronic document.

Figure 7:
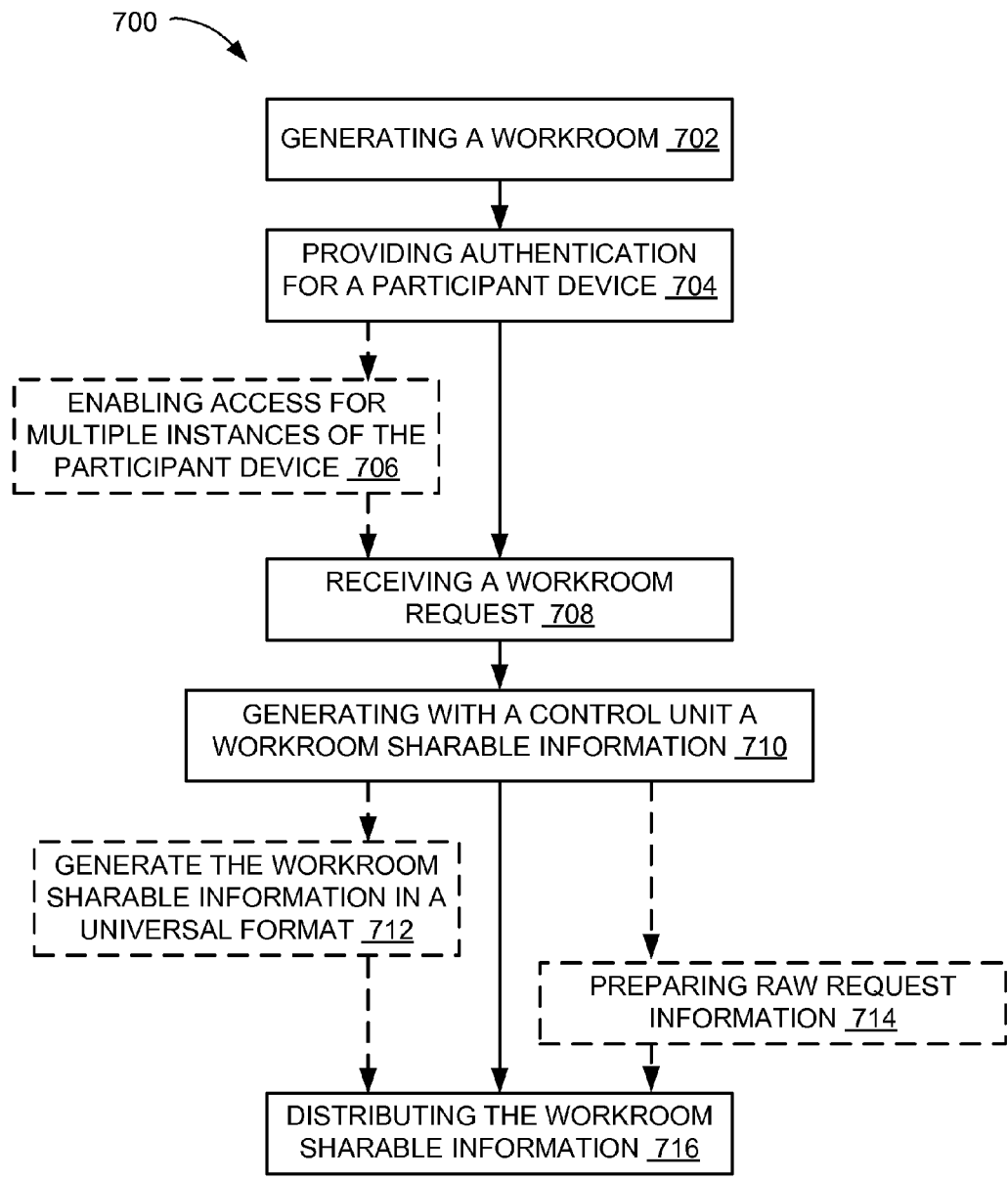
FIG. 7 is an exemplary flow chart of a method of operation of a device hub system in a further embodiment of the present invention.

Referring now to FIG. 7, therein is shown an exemplary flow chart 700 of a method of operation of a device hub system in a further embodiment of the present invention. The device hub system 100 can implement the exemplary flow chart 1000 as described above in FIG. 6.

The exemplary flow chart 700 can include generating a workroom for providing access to a workroom accessible resource, including an enterprise multifunctional printer, protected by a network firewall in a step 702. The device hub system 100 generate the workroom using the workroom generation module 626 of FIG. 6. The workroom generation module 626 can generate the workroom 220 of FIG. 2 as described above.

The exemplary flow chart 700 can further include providing authentication for a participant device to access the workroom in a step 704. The device hub system 100 can provide access to the participant device using the workroom access module 614 of FIG. 6. The workroom access module 614 can provide authentication for the participant device 222 of FIG. 2 as described above.

Optionally, the step 704 above can enable access for multiple instances of the participant device associated with a workroom participant to the workroom with a multi-time password, wherein the multi-time password is unique to the workroom participant, in a step 706, as depicted by the dashed line and dashed box. The workroom access module 614 can further enable access of the multiple instances of the participant device 226 to the workroom 220 with the multi-time password 654 of FIG. 6 as described above.

The exemplary flow chart 700 can further include the step of receiving a workroom request from the participant device through the workroom in a box 708. The device hub system 100 can receive the workroom request using the workroom operation module 616 of FIG. 6. The workroom operation module 616 can receive the workroom request 664 of FIG. 6 from the participant device 222 as described above.

The exemplary flow chart 700 can further include the step of generating with a control unit a workroom sharable information from the workroom request in a box 710. The device hub system 100 can generate the workroom sharable information using the workroom operation module 616. The workroom operation module 616 can generate the workroom sharable information 672 of FIG. 6 from the workroom request 664 as described above.

Optionally, the step 710 above can enable generating the workroom sharable information in a universal format in a box 712, as depicted by the dashed line and dashed box. The workroom operation module 616 can generate the workroom sharable information 672 in the universal format 674 of FIG. 6 as described above.

The exemplary flow chart 700 can optionally include preparing raw request information of the workroom request for printing on the workroom accessible resource in a step 714, as depicted by the dashed line and dashed box. The device hub system 100 prepare the raw request information with the workroom operation module 616. The workroom operation module 616 can prepare the raw request information 668 of FIG. 6 of the workroom request 665 for printing on the workroom accessible resource 226 as described above.

The exemplary flow chart 700 can further include distributing the workroom sharable information within the workroom in a box 716. The device hub system 100 can distribute the workroom sharable information 672 with the workroom operation module 616. The workroom operation module 616 can distribute the workroom sharable information 672 within the workroom 220 as described above.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A device hub system comprising:
a control unit configured to:
generate a workroom for providing access to a workroom accessible resource, including an enterprise multifunctional printer, protected by a network firewall,
provide authentication for a participant device to access the workroom by generating a multi-time password unique to a workroom participant to enable the workroom participant to access the workroom from a plurality of participant devices associated with the workroom participant, such that the workroom participant can enter the multi-time password from any of the plurality of participant devices to access the workroom to thereby reduce resource consumption of the device hub system,
receive a workroom request through the workroom to utilize resources associated with the workroom and/or share information with at least one other participant device connected to the workroom, the request comprising raw request information in an unprocessed or unformatted form, and
generate a workroom sharable information from the workroom request by converting the raw request information into a universal format usable by devices connected to the workroom including the workroom accessible resource and the at least one other participant device; and
a communication unit, coupled to the control unit, configured to distribute the workroom sharable information within the workroom.

2. The system as claimed in claim 1 wherein the control unit is configured to convert the raw request information of the workroom request into a format that is compatible for printing by the enterprise multifunctional printer.

3. The system as claimed in claim 1 wherein the control unit is configured to generate the workroom sharable information by rendering the raw request information of the workroom request.

4. The system as claimed in claim 1 wherein the control unit is configured to enable setting of a workroom policy.

5. The system as claimed in claim 1 wherein the control unit is configured to establish a remote bridge for enabling the participant device to remotely access the workroom.

6. The system as claimed in claim 1 wherein the control unit is configured to identify a restricted enterprise resource for designation to the workroom.

7. The system as claimed in claim 1 wherein the control unit is configured to generate the multi-time password for granting an untrusted device to access the workroom.

8. The system as claimed in claim 1 wherein the control unit is configured to operate the workroom accessible resources, including a smart TV or projector, for displaying the workroom sharable information.

9. A method of operation of a device hub system comprising:
- generating a workroom for providing access to a workroom accessible resource, including an enterprise multifunctional printer, protected by a network firewall;
- providing authentication for a participant device to access the workroom by generating a multi-time password unique to a workroom participant to enable the workroom participant to access the workroom from a plurality of participant devices associated with the workroom participant, such that the workroom participant can enter the multi-time password from any of the plurality of participant devices to access the workroom to thereby reduce resource consumption of the device hub system;
- receiving a workroom request from the participant device through the workroom to utilize resources associated with the workroom and/or share information with at least one other participant device connected to the workroom, the request comprising raw request information in an unprocessed or unformatted form;
- generating with a control unit a workroom sharable information from the workroom request by converting the raw request information into a universal format usable by devices connected to the workroom including the workroom accessible resource and the at least one other participant device; and
- distributing the workroom sharable information within the workroom.

10. The method as claimed in claim 9 wherein the raw request information of the workroom request is converted into a format that is compatible for printing by the enterprise multifunctional printer.

11. The method as claimed in claim 9 wherein generating the workroom sharable information includes generating the workroom sharable information by rendering the raw request information of the workroom request.

12. The method as claimed in claim 9, further comprising:
- retrieving and installing one or more support drivers associated with the workroom accessible resource at a work hub having the control unit, including retrieving and installing one or more drivers associated with the enterprise multifunctional printer at the work hub; and
- when the workroom request is a request for the enterprise multifunctional printer to perform an image forming operation, utilizing the one or more drivers installed at the work hub to convert the workroom request into a format that is compatible with the enterprise multifunctional printer to perform the image forming operation.

13. A non-transitory computer readable medium including instructions executable by a processor for operating a device hub system, the instructions comprising:
- generating a workroom for providing access to a workroom accessible resource, including an enterprise multifunctional printer, protected by a network firewall;
- providing authentication for a participant device to access the workroom by generating a multi-time password unique to a workroom participant to enable the workroom participant to access the workroom from a plurality of participant devices associated with the workroom participant, such that the workroom participant can enter the multi-time password from any of the plurality of participant devices to access the workroom to thereby reduce resource consumption of the device hub system;
- receiving a workroom request from the participant device through the workroom to utilize resources associated with the workroom and/or share information with at least one other participant device connected to the workroom, the request comprising raw request information in an unprocessed or unformatted form;
- generating a workroom sharable information from the workroom request by converting the raw request information into a universal format usable by devices connected to the workroom including the workroom accessible resource and the at least one other participant device; and
- distributing the workroom sharable information within the workroom.

14. The non-transitory computer readable medium as claimed in claim 13 wherein the raw request information of the workroom request is converted into a format that is compatible for printing by the enterprise multifunctional printer.

15. The non-transitory computer readable medium as claimed in claim 13 wherein generating the workroom sharable information includes generating the workroom sharable information by rendering the raw request information of the workroom request.

* * * * *

UNITED STATES PATENT AND TRADEMARK OFFICE
CERTIFICATE OF CORRECTION

PATENT NO. : 9,893,960 B2
APPLICATION NO. : 14/823911
DATED : February 13, 2018
INVENTOR(S) : Ramon Rubio et al.

Page 1 of 1

It is certified that error appears in the above-identified patent and that said Letters Patent is hereby corrected as shown below:

On the Title Page

In item (60), under related U.S. Application Data, in Column 1, Line 1, delete "Application No. 62036528" and insert -- Application No. 62/036,538 --, therefor.

In the Drawings

In Fig. 4, sheet 4 of 7, delete "CPMMECTED DEVICES" and insert -- CONNECTED DEVICES --, therefor.

Signed and Sealed this
Eleventh Day of December, 2018

Andrei Iancu
*Director of the United States Patent and Trademark Office*